July 6, 1943.  G. SAUER  2,323,422

SEWING MACHINE

Filed July 11, 1940  7 Sheets-Sheet 1

WITNESSES:

INVENTOR:
George Sauer,
BY
ATTORNEYS.

July 6, 1943.  G. SAUER  2,323,422
SEWING MACHINE
Filed July 11, 1940  7 Sheets-Sheet 2
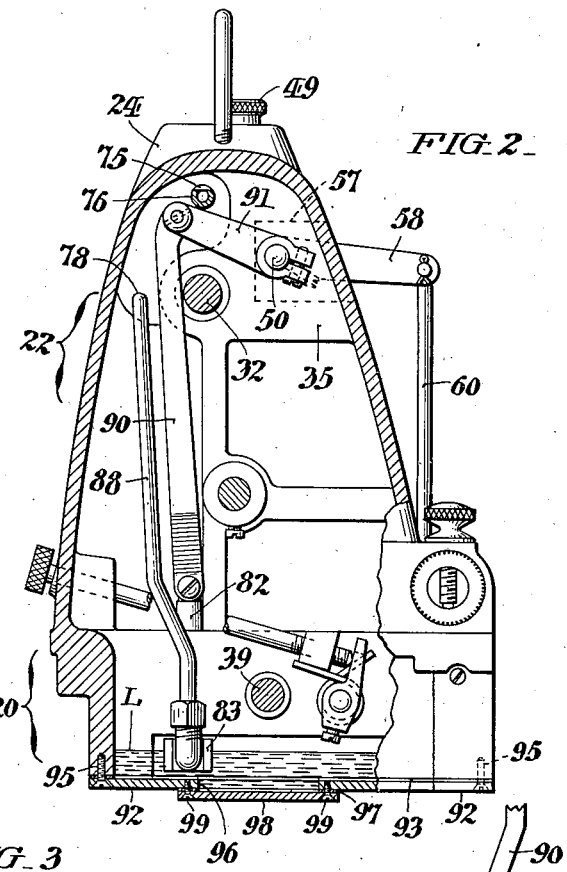
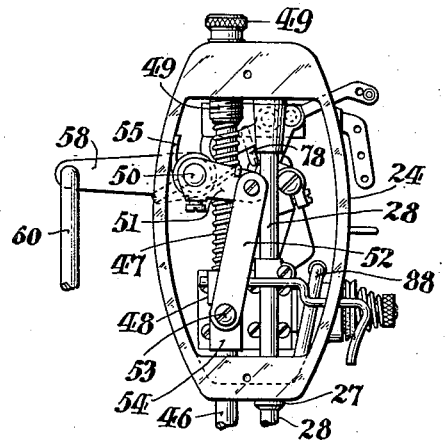
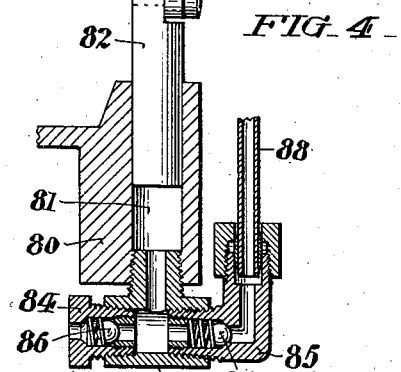
WITNESSES:
INVENTOR:
George Sauer,
BY
ATTORNEYS.

WITNESSES:

INVENTOR:
George Sauer,
BY
ATTORNEYS.

July 6, 1943.   G. SAUER   2,323,422
SEWING MACHINE
Filed July 11, 1940   7 Sheets-Sheet 4
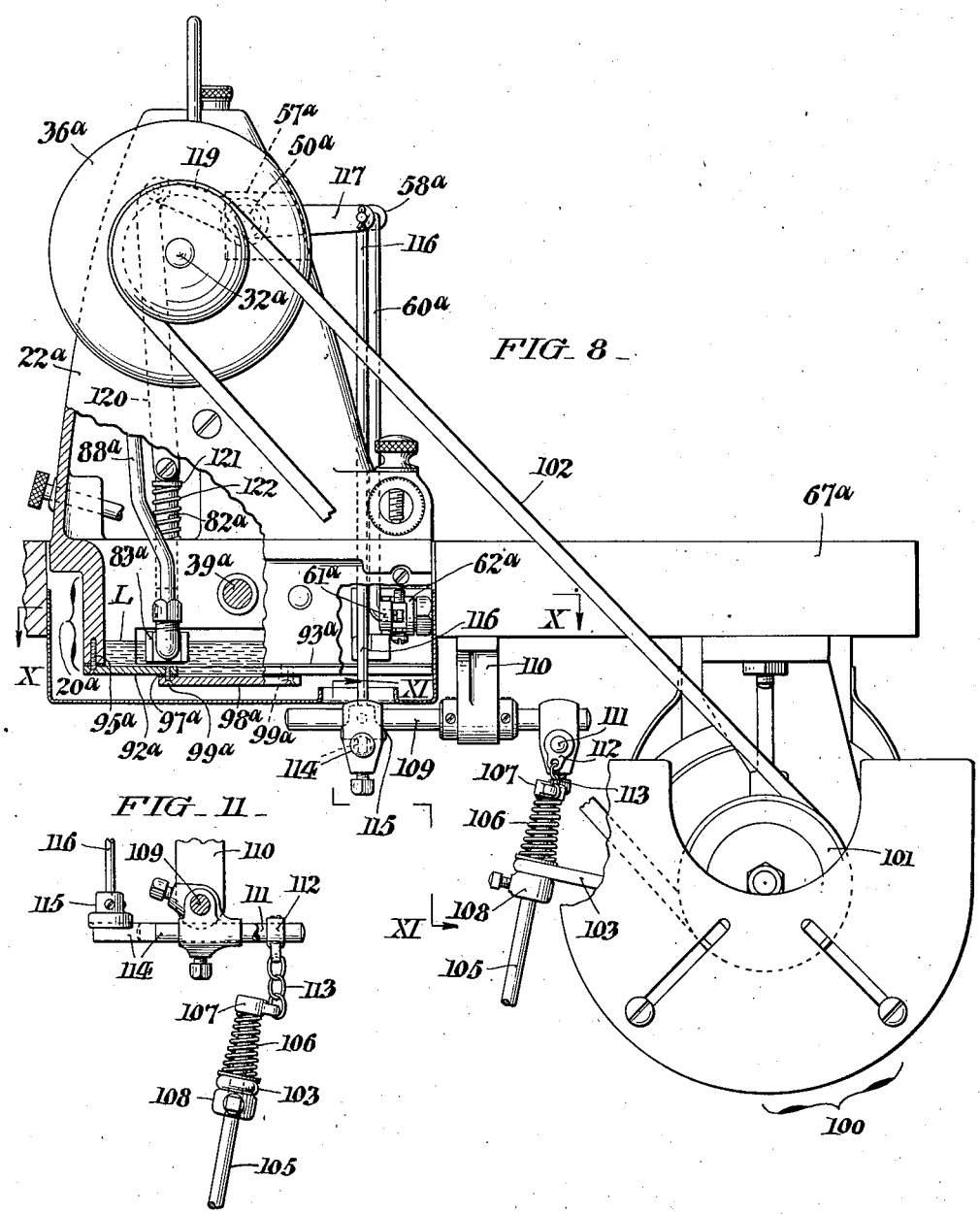
WITNESSES:
Woodrow Stevenson
William Bell, Jr.
INVENTOR:
George Sauer,
BY Paul Paul
ATTORNEYS.

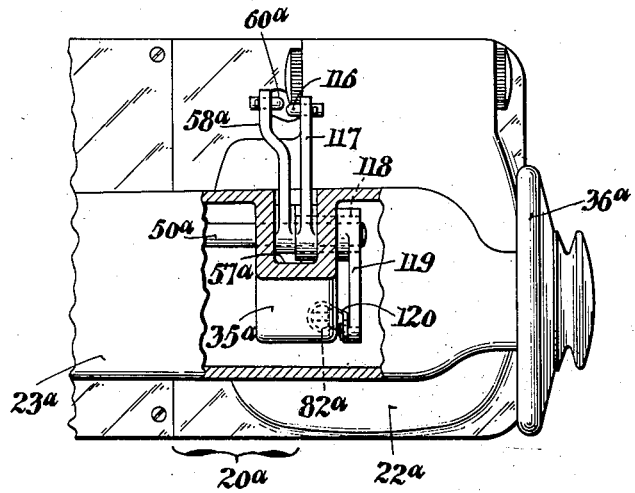
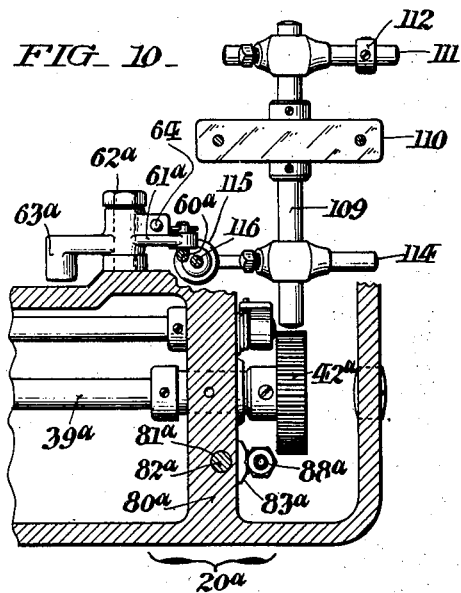

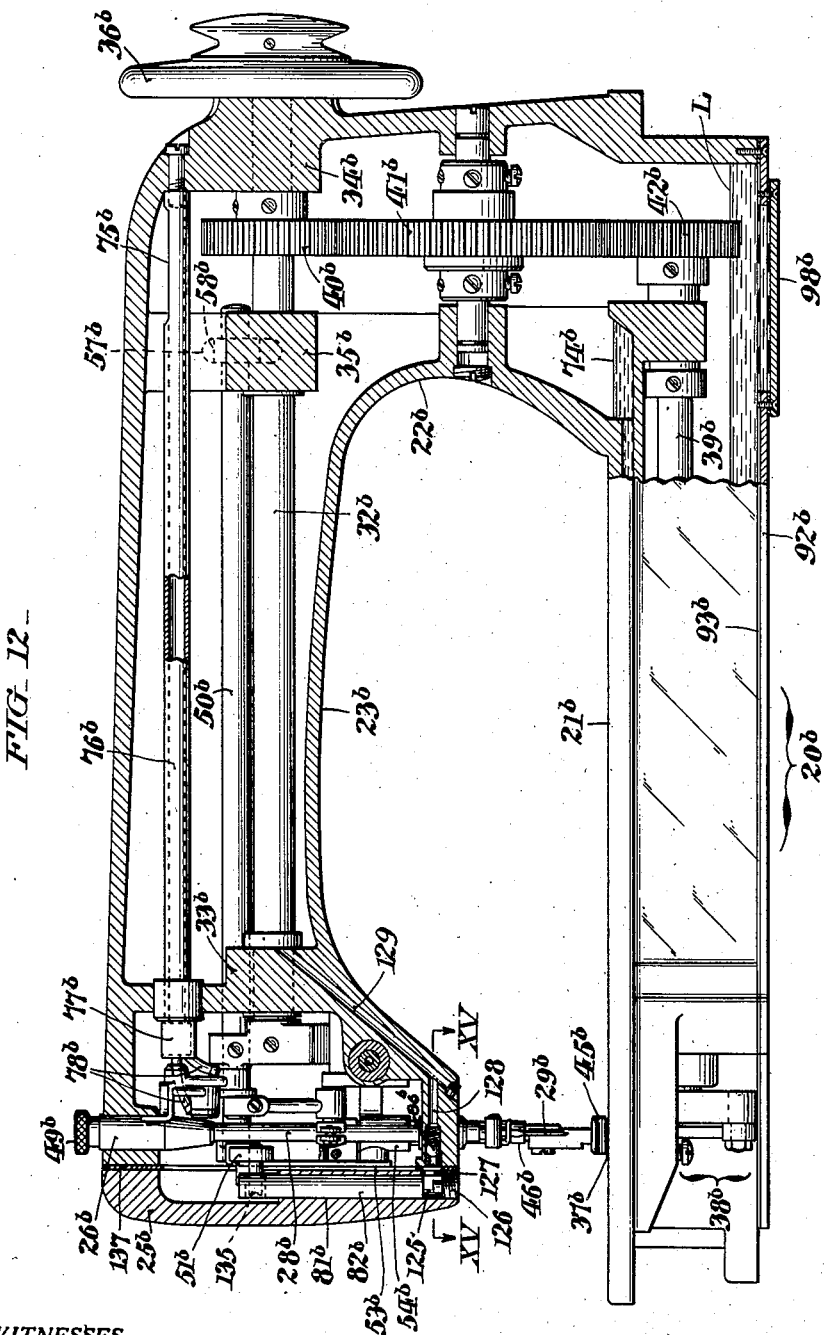

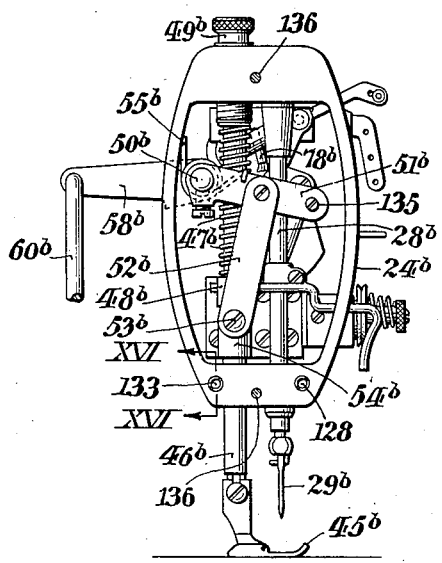
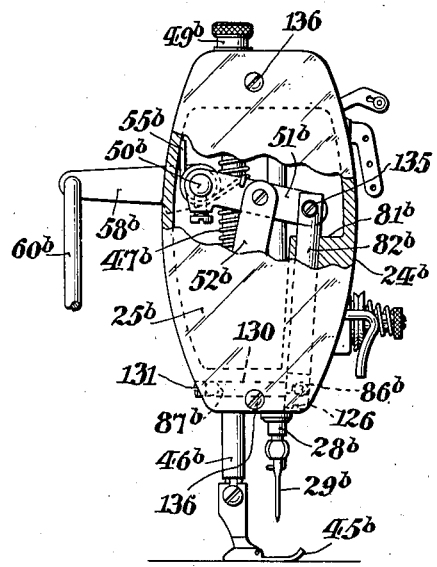
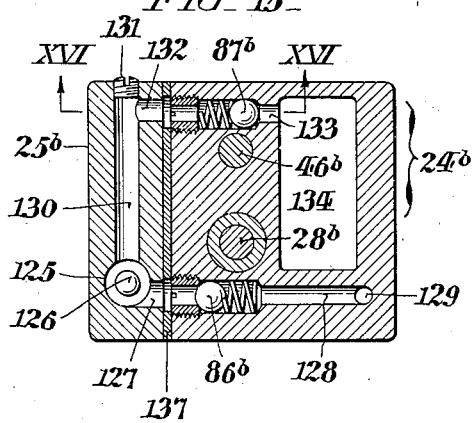
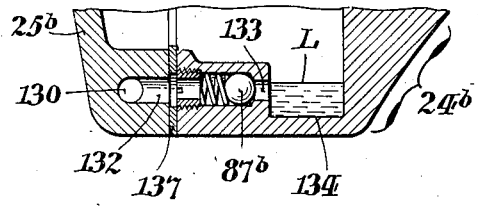

Patented July 6, 1943

2,323,422

UNITED STATES PATENT OFFICE 2,323,422

SEWING MACHINE

George Sauer, Berwyn, Ill., assignor to Union Special Machine Company, Chicago, Ill., a corporation of Illinois Application July 11, 1940, Serial No. 344,864

10 Claims. (Cl. 112—256)

This invention relates to sewing machines, and has reference more especially to sewing machines of the flat bed type with automatic lubrication systems which supply oil to the mechanism by which the stitch forming and feeding instrumentalities of the machines are actuated. With self-lubricating machines of the kind referred to, as ordinarily constructed, difficulty has been experienced on account of leakage of excess oil accumulation from the regions to which it is carried, for example, from the bottom of the needle head down through the lower guide bearings for the needle and presser bars, from whence it reached and soiled the work being operated upon in the machines, which leakage occurred notwithstanding measured or controlled supply of the oil to such regions.

The chief aim of my invention is to overcome the above difficulty, that is to say, to prevent accumulation of excess oil in the needle head or any other part of a sewing machine where it would be likely to find its way to the exterior. This objective I realize as hereinafter more fully disclosed, through provision of a periodically-operated pump means by which the excess oil is drawn from the region or regions where it is likely to accumulate and returned to the supply in the base of the machine for re-use.

Another aim of my invention is to provide for the operation of the pump means without necessitating the use of power or the dependence upon memory of the machine operator, which latter objective I realize in practice as also hereinafter more fully disclosed, through connection of said pump means to a manual control associated with the machine, for example, the manual control for the presser bar, or that for a power transmitter from which it is driven.

Other objects and attendant advantages will appear from the following detailed description of the attached drawings, wherein Fig. 1 is a view partly in front elevation and partly in longitudinal section of a sewing machine conveniently embodying my invention.

Fig. 2 is a cross sectional view taken as indicated by the angled arrows II—II in Fig. 1.

Fig. 3 is a fragmentary view showing the elevation of the needle head end of the machine with head cover removed.

Fig. 4 is a detail view on a larger scale corresponding to Fig. 1 and showing the construction of the pump means whereby the excess oil accumulation is drawn from the bottom of the needle head and returned to the supply in the base of the machine.

Fig. 8 shows the elevation of the drive end of another sewing machine provided with the pump means of my invention and showing how said pump means can be operated by a treadle control for a power transmitter by which the machine is driven, portions of the machine frame having been broken out to expose important parts at the interior.

Fig. 9 is a fragmentary view in top plan of the organization shown in Fig. 8 likewise with a portion of the frame broken out to expose internal parts.

Fig. 10 is a fragmentary horizontal section taken as indicated by the angled arrows X—X in Fig. 8.

Fig. 11 is a detail sectional view taken as indicated by the angled arrows in Fig. 8.

Fig. 12 is a view like Fig. 1 showing an alternative embodiment of my invention in which the pump is located within the needle head.

Fig. 13 shows the needle head of the machine of Fig. 12 in end elevation with its cover removed.

Fig. 14 shows the end elevation of the needle head with portions of the cover plate broken out and the head partly in section.

Fig. 15 is a detail sectional view on a larger scale taken as indicated by the angled arrows XV—XV in Fig. 12; and Fig. 16 is a fragmentary detail section taken as indicated by the angled arrows XVI—XVI in Figs. 13 and 15.

Figure 1:
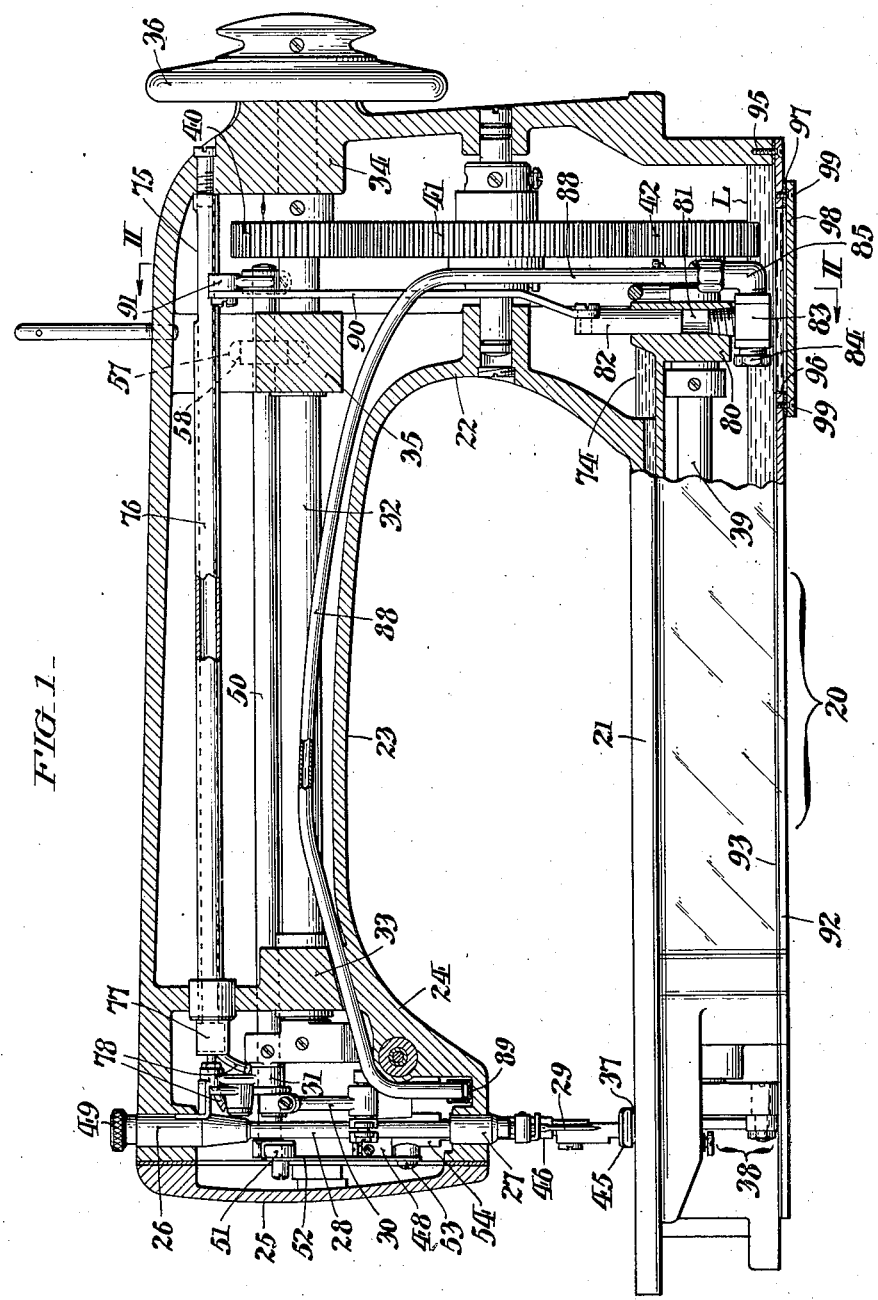
Figure 5:
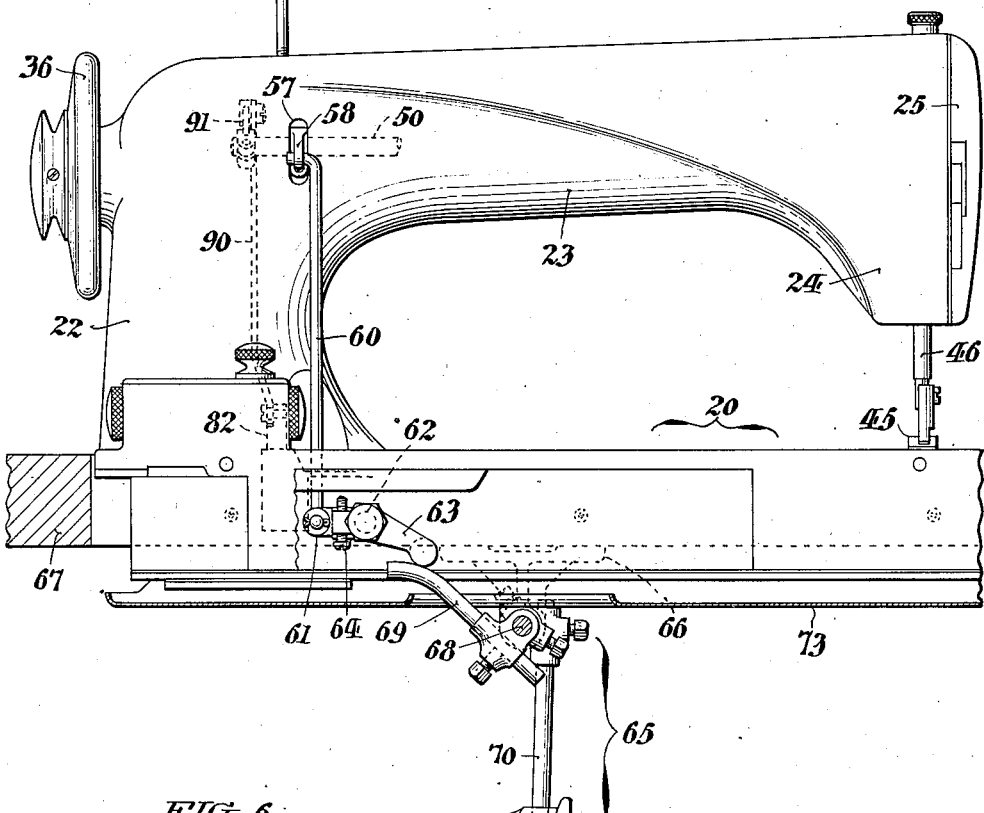
Fig. 5 shows the machine in rear elevation with the means whereby the pump is connected for operation to a knee press by which the presser foot of the machine is controlled.
Figure 6:
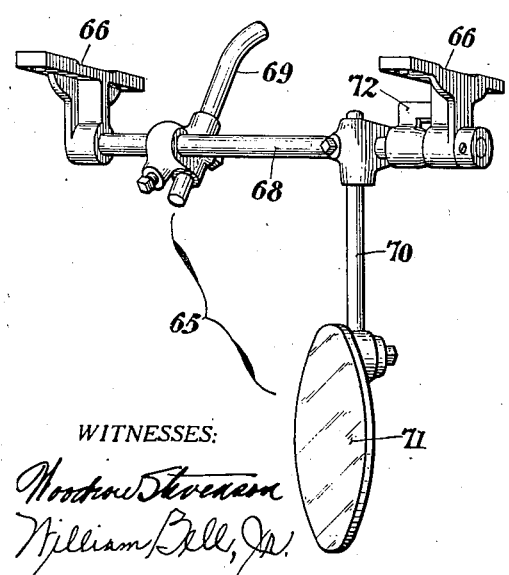
Fig. 6 is a perspective view of the knee press.
Figure 7:
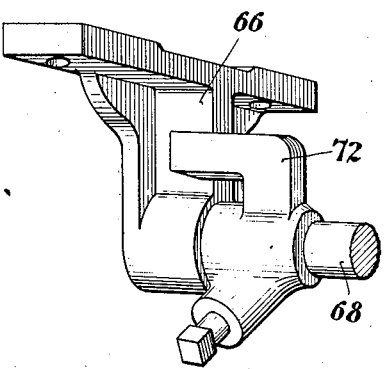
Fig. 7 is a perspective view on the larger scale showing a stop associated with the knee press.

Referring first more particularly to Figs. 1–7, the frame of the machine there illustrated is formed as an integral structure with a flat hollow horizontal base 20 whereof the top 21 serves as a work support which constitutes a main sump in which a supply of lubricating oil is normally maintained at the level L, and a communicating hollow standard 22 which rises from said base at one end and which sustains a hollow communicating overhanging arm 23. As shown, the overhanging arm terminates in a hollow needle head 24 which extends somewhat below the level of the arm with provision of an auxiliary sump for lubricating oil at its bottom, and which has a removable cover plate 25 at the front. Confined to endwise reciprocation by upper and lower guide bushings 26 and 27 within the head 24, is a vertical bar 28 with a needle 29 at its lower end. By means of a pitman 30 within the head 24, the needle bar is connected to a crank 31 on a rotary actuating shaft 32 which extends longitudinally through the hollow of the overhanging arm 23 and which is journalled at opposite ends in bearings 33, 34, and at an intermediate point in a bearing lug 35 within said arm. From Fig. 1 it will be noted that the shaft 32 extends through the right hand end bearing 34 to the exterior where it is provided with a combined hand and belt wheel 36. It is to be understood that suitable complemental stitch-forming instrumentalities, not shown, beneath the work support 21 cooperate with the needle 29 in stitch formation. The feed mechanism of the machine includes a feed dog which is partly shown at 37 in Fig. 1, and which. through suitable connections shown at 38, is actuated from a rotary shaft 39 extending horizontally of the machine base 20, said shaft 39 being connected to the needle shaft 32 for rotation in unison therewith by a train of intermeshing spur gears 40, 41, 42 within the standard 22. Arranged to oppose the action of the feed dog 37 is a presser foot 45 which is connected to the lower end of the presser bar 46 extending upwardly into the needle head 24. A helical compression spring 47 surrounding the bar 46 within the needle head bears at its lower end upon the top of a collar 48 secured to said bar. The upper end of the spring 47 bears against an abutment sleeve 49 which serves as the upper bearing for the presser bar which sleeve is secured with capacity for endwise adjustability in the top of the needle head 24.

The presser foot 45 is manually controllable by the means about to be described. Extending longitudinally through the needle arm 23 is a rock shaft 50, which, within the needle head 24, carries a crank arm 51 having a link connection 52 with the collar 48 on the presser bar 46. The link connection 52 is pivoted at 53 to a sleeve 54 freely mounted on the presser bar so that the presser bar can normally move up and down without interference in riding over thickness irregularities in the fabric being stitched. When the rock shaft 50 is oscillated to lift the presser foot, the upper end of the sleeve 54 will engage the lower face of the collar 48 and thus lift the presser bar to raise the presser foot free of the work. The arm 51 is subject to a torsion spring 55 which tends to urge the link 52 downward. At its right hand end, Fig. 1, the rock shaft 50 passes through the bearing lug 35 and a portion thereof is exposed in a recess 57 within said lug, said recess being open at the back of the overhanging needle arm 23. Secured to the exposed portion of the rock shaft 50 within the recess 57 is an actuating lever arm 58 which extends outwardly of said recess from the back of the needle arm and which is connected by a drop link 60 to an arm 61 on a stud 62 at the back of the rear side wall of the base 20. Integrally formed with the arm 61 is a finger 63 which is adapted to be actuated by a knee press 65, see Figs. 5, 6 and 7. As shown, the knee press 65 includes a pair of brackets 66 which are secured in spaced relation to the bottom of the table 67 whereon the machine is supported. Journalled in the brackets 66 is a rock shaft 68 whereto is affixed between said brackets, a finger 69 which is adapted to engage the finger 63 and a pendant rod arm 70 whereto is secured, with capacity for vertical adjustment, a knee pad 71. Through cooperation of a stop 72 on the rock shaft 68 of the knee press 65 with the vertical web of one of the brackets 66, the pendant rod arm 60 is normally maintained by the spring 55 in the position shown in Fig. 5 through the train of connections reaching to the knee press, with the finger 69 touching the finger 63, the action of said spring being resisted by the stop member 72. Accordingly, as the knee pad 71 is moved toward the left in Fig. 5, the finger 63 is moved counterclockwise about the axis of the stud 62 with the result that through the link 60, counterclockwise motion is imparted to the rock shaft 50 with attendant lifting of the presser against action of a torsion spring 51 in a well known way. Since there is no positive connection between the fingers 63 and 69, it is evident that the machine may be tilted for access to the parts beneath the work support and afterwards righted without change in the operative relation of said fingers. When the machine is tilted, the action of the torsion spring 55 is resisted by engagement of an adjustable screw 64 on the arm 61 with a lateral stop projection on the machine base, see Fig. 5. A pan 73 (Fig. 5) is placed beneath the machine to catch any oil which may drip therefrom.

From Fig. 1 it will be observed that the lowermost gear of the train 40—42 dips into a supply of lubricating oil within the machine base 20, so that by rotation of the gear train, oil is taken from the supply and dispersed within the standard, such oil finding its way to the bearings for the upper shaft 32 and to the other parts within the overhanging arm 23. Some of the dispersed oil is caught in a small well 74 formed by an internal prolongation of the upper wall 21 of the base 20 from which the oil flows by gravity through a horizontal duct in said wall to parts of the complemental stitch forming and the feed means at the needle end of the machine. Some of the dispersed oil is also caught in a trap 75 at one end of a conduit or tube 76 which extends forwardly within the overhanging arm 23 and terminates in a small trough 77 within the hollow of the needle head 24. The oil so conducted is carried by means of tubes and wicks 78 which lead from the trough 77 of the conduit to the moving parts of the needle actuating mechanism.

The provisions made in accordance with my invention for disposing of the excess oil which accumulates in the auxiliary sump at the bottom of the needle head 24 are as follows: Depending from the internal extension of the top wall of the machine base 20 is a boss 80 which has a vertical bore 81 to constitute the cylinder of a reciprocating pump whereof the piston is indicated at 82. Screwed into the bottom of the bore 81 is a T fitting 83, and screwed in turn into the opposite ends of the horizontal portion of this fitting 83 are plugs 84 and 85 which respectively house ball valves 86 and 87 whereof the first yields to pressure and the other to suction. Connected to the plug 85 is a tube 88 which extends upwardly within the standard, then horizontally through the needle arm 23 to the needle head and thence downwardly into the sump at the bottom of said head. At its terminal end, the tube is capped by a strainer 89. Referring to Figs. 1 and 2 the piston 82 of the pump is coupled by means of a vertical link 90 with an actuating arm 91 secured to the right hand end of the rock shaft 50 where the latter protrudes beyond the bearing lug 35. As a consequence of this arrangement, it will be seen that each time that the presser foot 45 is lifted through manipulation of the knee press 65, the piston 82 of the pump will be actuated and the oil accumulation within the needle head consequently removed and returned to the supply within the machine base. By reference to Fig. 4, it will be seen that during the upward movement of the piston 82, the valve 85 will open under the suction created so that the oil is drawn from the tube 88 into the pump cylinder; while, when the piston descends, the valve 85 will close and the valve 86 will open under the pressure to permit discharge of the oil from the cylinder into the machine base.

As shown in Figs. 1 and 2, the machine base 20 is closed at the bottom by a removable cover plate 92 which is secured with interposition of a sealing gasket 93, by a number of screws 95 at suitably spaced points around the side walls of said base. For convenience of access to the pump when necessary or desired, the cover plate 92 is provided with an opening 96, which in turn, is closed with interposition of a sealing gasket 97 by a removable supplemental plate 98 secured by screws 99 to the main cover plate.

Reference will now be had to the embodiment of my invention shown in Figs. 8-11. The sewing machine there shown is, except as hereinafter noted, identical with that of Figs. 1-7, and accordingly, in order to obviate repetitive description, all the corresponding parts have been identified with the same reference numerals previously employed except for the addition in each instance of the letter *a* for convenience of ready distinction. In the alternative embodiment of Figs. 8-11, the machine is arranged to be driven by an electric motor operated transmitter comprehensively designated by the numeral 100, whereof the pulley 101 is coupled, through a belt 102 with the drive wheel 36a of the sewing machine. The transmitter 100 may be of any approved type and is provided with a control lever 103 which actuates a clutch (not shown) for connecting and disconnecting the pulley 101 from the motor shaft. The transmitter control lever 103 is arranged to be actuated by a rod 105 which extends through a foot treadle, not shown. The connection between the upper end of the rod 105 and the lever 103 is a flexible one and includes a spring 106 which is in compression between a collar 107 at the upper end of the rod and the top of the lever 103, another collar 108 below the arm normally serving to limit the free axial movement of the rod. In order that the control rod 105 for the transmitter 100 may also be utilized as a means for actuating the piston 82a of the needle head drain pump within the bottom of the standard 22a, I have provided means including a rock shaft 109 which is journalled in a fixed bracket 110 beneath the machine support or table 67a. Secured to one end of the shaft 109 is a rod arm 111 whereon is adjustably secured an eye collar 112. By means of a chain 113, the eye of the collar 112 is coupled with an eye on a collar 107 at the upper end of the control rod 105. At the other side of the bearing 110, the rock shaft 109 carries another rod arm 114 which is horizontally arranged as shown in Fig. 11 with its free end loosely engaging within the clevise of a collar 115 at the lower end of a vertical thrust rod 116. As shown in Fig. 8, the rod 116 passes upwardly through the base of the machine for connection of its upper end to an arm 117 which reaches outward from the rearwardly open recess 57a at the back of the overhanging frame arm 23 alongside the arm 58a on the rock shaft 50a of the presser bar control means within said frame arm. From Fig. 9, it will be noted that the arm 117 is secured to a sleeve 118 which is rotatively free on the rock shaft 50a and which extends toward the right beyond the bearing lug 35a. To the inner end of the sleeve 118 is secured a horizontal arm 119, which, through a drop link 120, is connected to the upper end of the piston 82a of the pump 81a whereof the piston or plunger 82a is provided near its top with a circumferential flange 121. A spring 122 surrounds the piston 82a and is in compression between the top of the pump cylinder 81a and the flange 121 at the top of said piston. From the construction just described, it follows that when the rod 105 is shifted axially upward under the action of the foot treadle (not shown) to release the clutch of the transmitter 100, movement is communicated through the rock shaft 109 and the rod 116 upwardly to the arm 117 with attendant depression through the arm 119 and the link 120, of the pump piston 82a against the action of the spring 122 to force oil previously drawn into the pump cylinder 81a from the needle head 24a back into the oil supply within the machine base 20a. Upon subsequent release of the treadle, the piston 82a will be raised by the spring 122 (this action being permitted by reason of the flexible connection 113) and draw the excess oil from the needle head 24a into the pump cylinder 81a. The machine of Fig. 8, it will be noted, may, like the machine of Figs. 1-7, be tilted relative to or entirely withdrawn from the table and afterwards replaced without disturbing the relation between the pump actuating means and the transmitter control by reason of the "loose" connection between the finger 114 and the clevise collar 115 at the bottom end of the thrust rod 116. It is to be understood that the presser foot of the machine illustrated in Figs. 8-11 is adapted to be operated in the same way as described in connection with the first embodiment of my invention by a knee press which has been omitted from Figs. 8-10 in order to avoid complication and confusion.

Except as particularly pointed out presently, the alternative embodiment of my invention shown in Figs. 12-16 is identical with that shown in Figs. 1-7, and accordingly here again, in order to obviate the necessity for duplicate description, the same reference numerals have been employed to designate corresponding parts, with the addition, however, in each instance of the letter *b* for convenience of distinction. In this alternative embodiment of my invention, the pump for draining the needle head is located within said head instead of in the bottom of the standard as in Figs. 1-7 and in Figs. 8-11. As shown in Figs. 12 and 14, the cylinber 81b of the pump is provided by a lug on the end cover 25b for the needle head 24b, the vertical bore 125 within which the piston 82b operates being closed at the bottom by a screw plug 126. Extending laterally from the bottom of the bore 125 is a port 127 which is in axial registry with a horizontal bore 128 in the bottom wall of the needle head 24b, the latter bore in turn being in communication with an upwardly inclined bore 129, which, at its right hand front end in Fig. 12, is open into the hollow of the needle arm. Set into an enlargement of the bore 128 is a spring ball valve 86b which yields to pressure. Also extending crosswise of the bottom of the pump bore 125 within the end cover 25b of the needle head 24b is a bore 130, which, at its rear end, is closed by a screw plug 131. From the duct 130, leads a lateral port 132 in direct register with a port 133 which opens into the oil collecting sump 134 at the interior of the needle head 24b (Figs. 15 and 16), said port 133 being enlarged to accommodate a suction responsive spring ball valve 87b. At its upper end, the piston 82b of the pump 81b has a loose connection with a stud 135 projecting laterally from an arm 51b, which latter, in this instance, is extended beyond the point of the pivotal connection of the link 52b therewith, see Figs. 13 and 14. The cover 25b is secured by screws 136 and between it and the face of the needle head 24b is interposed a gasket 137 to form an oil tight joint.

It is to be understood that the machine of Figs. 12–16 may, according to my invention, be arranged for the operation of the pump by either a presser foot knee press control such as featured in Figs. 1–7, or by a transmitter control such as featured in Figs. 8–11. It is to be further understood that my invention is not necessarily limited to the use of a reciprocating pump since other types of fluid displacement means may be substituted within the scope of the broader of the appended claims. The expression "manual means" occurring in the claims is used in a comprehensive sense to include treadle and knee press devices such as hereinbefore mentioned, as well as devices intended to be moved by hand.

Having thus described my invention, I claim:

1. A sewing machine comprising stitch forming and feeding mechanism; a presser foot and manual control means therefor; means for supplying lubricating oil to said mechanism; a sump for collecting excess oil supplied to parts of the mechanism; and means including a pump connected to the manual presser foot control for operation thereby to draw off the excess oil accumulation from the sump.

2. A sewing machine according to claim 1, in which the machine has a hollow frame containing the stitch forming and feeding mechanism and the pump; in which the presser foot control includes a rock shaft within the frame whereto the pump is operatively connected; and in which an actuating arm on the rock shaft extends to the exterior of the frame with provision for oil-tightness.

3. A sewing machine comprising a frame with a hollow base containing a supply of lubricating oil, a communicating hollow standard rising from the base and sustaining a communicating hollow overhanging arm with a hollow head at its free end whereof the bottom extends below said arm; needle operating means within the head, an actuating shaft for the needle operating means extending longitudinally of the hollow of the overhanging arm; feed means, an actuating shaft for the feed means extending longitudinally of the hollow of the machine base; a train of transmission gears within the hollow of the standard connecting the two shafts which gears in their rotation take oil from the supply and disperse it upwardly within the machine frame; means for trapping some of the oil so dispersed and conducting it to the needle head for lubrication of the needle operating means; a manual control means for rendering the machine operative or inoperative; and means including a normally inactive pump connected to the control means for actuation thereby to remove excess oil accumulation from the bottom of the needle head and to return it to the supply in the machine base.

4. A sewing machine according to claim 3, in which the pump is located within the machine base; and in which an oil return conduit extends up from the bottom of the needle head, horizontally through the needle arm, and downwardly through the standard to the pump.

5. A sewing machine comprising a frame with a hollow base containing a supply of lubricating oil, a communicating hollow standard rising from the base and sustaining a communicating hollow overhanging arm with a hollow head at its free end whereof the bottom extends below said arm; needle operating means within the head; an actuating shaft for the needle operating means extending longitudinally of the overhanging arm; means taking oil from the supply and dispersing it upwardly within the machine frame; means for conducting some of the dispersed oil to the needle head for lubrication of the needle operating means; an axially-shiftable presser bar extending upward into the head and having a presser foot at its lower end; manual control means for the presser foot including a rock shaft which extends longitudinally within the needle arm, and an actuating arm extending with provision for oil tightness, from the rock shaft to the exterior; and means for returning excess oil accumulation from the bottom of the needle head to the supply in the base including a reciprocating pump within the machine frame, and a connection between the piston of the pump and the rock shaft whereby the pump is actuated from the presser foot control means.

6. A sewing machine comprising a frame with a hollow base containing a supply of lubricating oil, a communicating hollow standard rising from the base and sustaining a communicating hollow overhanging arm with a hollow head at its free end whereof the bottom extends below said arm; needle operating means within the head; an actuating shaft for the needle operating means extending longitudinally of the overhanging arm; means taking oil from the supply and dispersing it within the machine frame; means for conducting some of the dispersed oil to the needle head for lubrication of the needle operating means; an axially shiftable presser bar extending upward into the head and having a presser foot at its lower end; manual control means for the presser bar including a rock shaft which extends longitudinally within the needle arm, a bearing lug within the needle arm for the rock shaft, said lug having a recess open to the exterior in which a portion of the rock shaft is exposed, and an actuating arm extending outwardly of the exposed portion of the rock shaft to the exterior; a power drive with manual means for controlling it; means for returning excess oil accumulation from the bottom of the needle head to the supply in the base of the machine including a reciprocating pump within the machine frame; and operating connections between the pump piston and the power drive control means including a sleeve rotatively free on the rock shaft of the presser bar control and extending through one side of the bearing lug in the needle arm into the recess of said lug, an arm on the inner end of the sleeve connected to the piston of the pump, and an outwardly-extending arm on the exposed end of the sleeve within the recess connected to the power drive means.

7. A sewing machine comprising a frame with a base and an overhanging arm which terminates in a hollow needle head having an oil sump at the bottom thereof; stitch forming mechanism including needle actuating means within a portion of the needle head above the sump; means for conducting lubricating oil to the needle actuating means; manual means for rendering the machine operative or inoperative; a pump for intermittently removing the collected oil from the sump; and mechanical means connecting the pump with the manual control means for operation solely by the latter at each actuation thereof in starting and stopping the machine.

8. A sewing machine comprising a frame with a base and an overhanging arm which terminates in a hollow needle head having an oil sump at the bottom thereof; stitch forming mechanism including needle actuating means within the needle head above the sump; means for conducting lubricating oil to the needle actuating means; manual means for rendering the machine operative or inoperative; a pump located within the needle head for removing the collected oil from the sump; and means connecting the pump with the manual control means for operation by the latter only at each actuation thereof.

9. A sewing machine comprising a frame with a base and an overhanging arm which terminates in a hollow needle head having an oil sump at the bottom thereof, said needle head also having a removable end cover; stitch forming mechanism including needle actuating means within a portion of the needle head above the sump; means for conducting oil to the needle actuating means; a manual control means for rendering the machine operative or inoperative; and means including a normally inactive pump connected to the main control means for actuation thereby to draw off the excess oil accumulation from the sump, said pump being of the reciprocating type and having its cylinder integrally formed with the needle head cover.

10. A sewing machine comprising a frame with a hollow base which affords a main sump for lubricating oil; and an overhanging arm which terminates in a hollow needle head having an auxiliary sump at the bottom thereof; stitch forming mechanism including needle actuating means within a portion of the needle head above the auxiliary sump; means for conducting oil from the main sump to the needle actuating means in the needle head; manual control means for rendering the machine operative or inoperative; a pump for intermittently returning the oil accumulated in the auxiliary sump in the needle head to the main sump in the machine base; and mechanical means connecting the pump to the manual control means for operation solely by the latter at each actuation thereof in starting and stopping the machine.

GEORGE SAUER.